(12) United States Patent
Kiilerich Pratas et al.

(10) Patent No.: US 12,464,361 B2
(45) Date of Patent: Nov. 4, 2025

(54) BEAMFORMED DISCOVERY

(71) Applicant: NOKIA TECHNOLOGIES OY, Espoo (FI)

(72) Inventors: Nuno Kiilerich Pratas, Gistrup (DK); Lianghai Ji, Aalborg (DK); Jeroen Wigard, Klarup (DK)

(73) Assignee: Nokia Technologies Oy, Espoo (FI)

( * ) Notice: Subject to any disclaimer, the term of this patent is extended or adjusted under 35 U.S.C. 154(b) by 506 days.

(21) Appl. No.: 17/911,797

(22) PCT Filed: Mar. 23, 2020

(86) PCT No.: PCT/EP2020/057978
§ 371 (c)(1),
(2) Date: Sep. 15, 2022

(87) PCT Pub. No.: WO2021/190723
PCT Pub. Date: Sep. 30, 2021

(65) Prior Publication Data
US 2023/0138008 A1 May 4, 2023

(51) Int. Cl.
H04W 48/16 (2009.01)
H04W 12/63 (2021.01)
H04W 16/28 (2009.01)

(52) U.S. Cl.
CPC ........... *H04W 12/63* (2021.01); *H04W 16/28* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2011/0034196 A1* | 2/2011 | Jonishi | H04W 24/02 455/509 |
| 2016/0380820 A1 | 12/2016 | Horvitz et al. | |
| 2017/0201894 A1* | 7/2017 | Byun | H04W 72/56 |
| 2018/0115958 A1 | 4/2018 | Raghavan et al. | |
| 2018/0343605 A1 | 11/2018 | Wu et al. | |

OTHER PUBLICATIONS

International Search Report and Written Opinion dated Nov. 10, 2020 corresponding to International Patent Application No. PCT/EP2020/057978.
Roessler et al., "LTE- Advanced (3GPP Rel.12) Technology Introduction", Rohde & Schwarz, 2014, 59 pages.
"3rd Generation Partnership Project; Technical Specification Group Services and System Aspects; Proximity-based services (ProSe); Stage 2 (Release 15)", 3GPP TS 23.303 V15.1.0, Jun. 2018, pp. 1-130.
Office action received for corresponding European Patent Application No. 20713282.0, dated Oct. 11, 2024, 4 pages.

* cited by examiner

*Primary Examiner* — Minh Trang T Nguyen
(74) *Attorney, Agent, or Firm* — Barta Jones, PLLC

(57) ABSTRACT

There is provided an apparatus comprising one or more processors, and one or more memories storing instructions that, when executed by the one or more processors, cause the apparatus to perform: receiving, by a user equipment, directional probability information comprising a plurality of directions with probabilities, wherein a probability of a direction of the plurality of directions indicates how probable it is that another use equipment is in that direction; and determining beam widths and beamforming directions based on the probabilities.

17 Claims, 11 Drawing Sheets

200
BEAMFORMED DISCOVERY

FIELD

Various example embodiments relate to beamformed discovery procedure in device-to-device communication.

BACKGROUND

There may be situations where there is need for a user equipment, e.g. a mobile phone, to be aware of other user equipments in proximity. For example, in device-to-device communication other user equipments may be found via a discovery procedure. Many devices having sidelinks around may, however, cause interference issues.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided an apparatus comprising one or more processors, and one or more memories storing instructions that, when executed by the one or more processors, cause the apparatus to perform: receiving, by a user equipment, directional probability information comprising a plurality of directions with probabilities, wherein a probability of a direction of the plurality of directions indicates how probable it is that another user equipment is in that direction; and determining beam widths and beamforming directions based on the probabilities.

According to a second aspect, there is provided an apparatus comprising one or more processors, and one or more memories storing instructions that, when executed by the one or more processors, cause the apparatus to perform: receiving position information of a plurality of user equipments; a) determining, at least based on the position information, user equipment specific directional probability information for a user equipment of the plurality of user equipments, wherein the directional probability information comprises a plurality of directions with probabilities, wherein a probability of a direction of the plurality of directions indicates how probable it is that another user equipment is in that direction; and transmitting the user equipment specific directional probability information to the user equipment; or b) determining service specific directional probability information at least based on the position information of those user equipments of the plurality of user equipments which are associated with the service; and transmitting the service specific directional probability information to a user equipment associated with the service.

According to a third aspect, there is provided a method comprising: receiving, by a user equipment, directional probability information comprising a plurality of directions with probabilities, wherein a probability of a direction of the plurality of directions indicates how probable it is that another user equipment is in that direction; and determining beam widths and beamforming directions based on the probabilities.

According to a fourth aspect, there is provided a method comprising: receiving position information of a plurality of user equipments; a) determining, at least based on the position information, user equipment specific directional probability information for a user equipment of the plurality of user equipments, wherein the directional probability information comprises a plurality of directions with probabilities, wherein a probability of a direction of the plurality of directions indicates how probable it is that another user equipment is in that direction; and transmitting the user equipment specific directional probability information to the user equipment; or b) determining service specific directional probability information at least based on the position information of those user equipments of the plurality of user equipments which are associated with the service; and transmitting the service specific directional probability information to a user equipment associated with the service.

According to a fifth aspect, there is provided a non-transitory computer readable medium comprising program instructions that, when executed by at least one processor, cause an apparatus to at least to perform a method according to the third aspect or fourth aspect and the embodiments thereof.

According to a sixth aspect, there is provided a computer program configured to cause a method according to the third aspect or fourth aspect and the embodiments thereof to be performed.

According to a seventh aspect, there is provided an apparatus comprising means for performing a method according to the third aspect or fourth aspect and the embodiments thereof. The means comprises at least one processor; and at least one memory including computer program code, the at least one memory and the computer program code configured to, with the at least one processor, cause the performance of the apparatus.

DETAILED DESCRIPTION

Figure 1A:
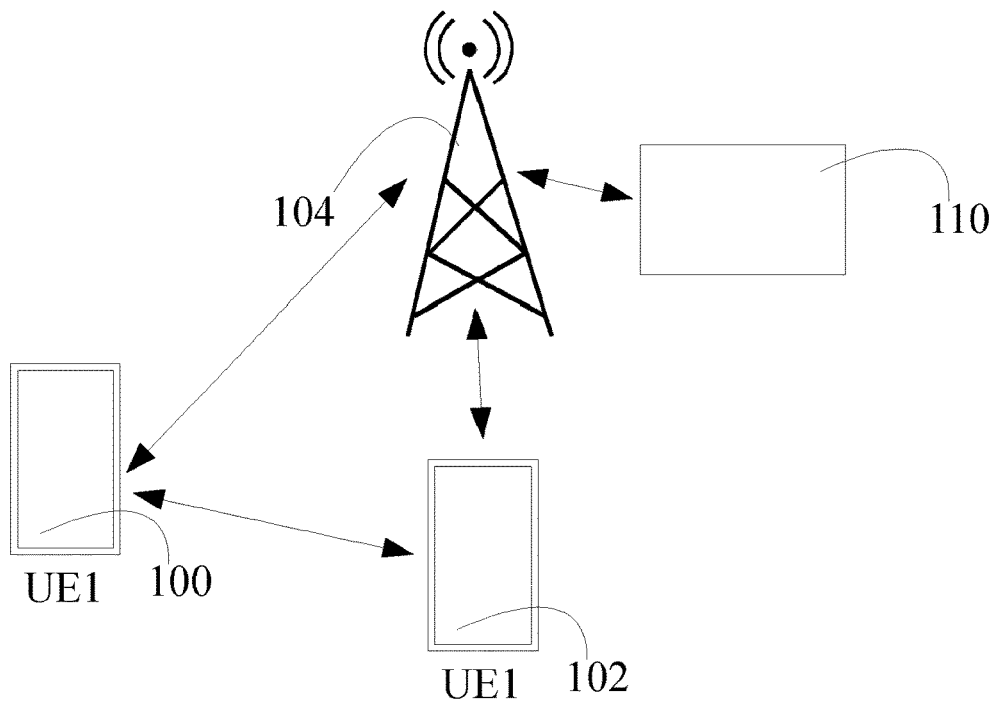
FIG. 1a shows, by way of example, a system architecture of communication system.

FIG. 1a shows, by way of an example, a system architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1a shows a part of an exemplifying radio access network. FIG. 1a shows user devices 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the NodeB is called uplink (UL) or reverse link and the physical link from the NodeB to the user device is called downlink (DL) or forward link. It should be appreciated that NodeBs or their functionalities may be implemented by using any node, host, server or access point etc. entity suitable for such a usage. A communications system typically comprises more than one NodeB in which case the NodeBs may also be configured to communicate with one another over links, wired or wireless, designed for the purpose. These links may be used for signalling purposes. The NodeB is a computing device configured to control the radio resources of the communication system it is coupled to. The NodeB may also be referred to as a base station (BS), an access point or any other type of interfacing device including a relay station capable of operating in a wireless environment. The NodeB includes or is coupled to transceivers. From the transceivers of the NodeB, a connection is provided to an antenna unit that establishes bi-directional radio links to user devices. The antenna unit may comprise a plurality of antennas or antenna elements. The NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, also including a relay node. An example of such a relay node is a layer 3 relay (self-backhauling relay) towards a base station.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. A user device may also be a device having capability to operate in Internet of Things (IoT) network which is a scenario in which objects are provided with the ability to transfer data over a network without requiring human-to-human or human-to-computer interaction.

It is obvious for a person skilled in the art that the depicted system is only an example of a part of a radio access system and in practice, the system may comprise a plurality of NodeBs, the user device may have an access to a plurality of radio cells and the system may comprise also other apparatuses, such as physical layer relay nodes or other network elements, etc. A cellular radio system may be implemented as a multilayer network including several kinds of cells, such as macrocells, microcells and picocells, for example. Typically, in multilayer networks, one access node provides one kind of a cell or cells, and thus a plurality of NodeBs are required to provide such a network structure.

Figure 1B:
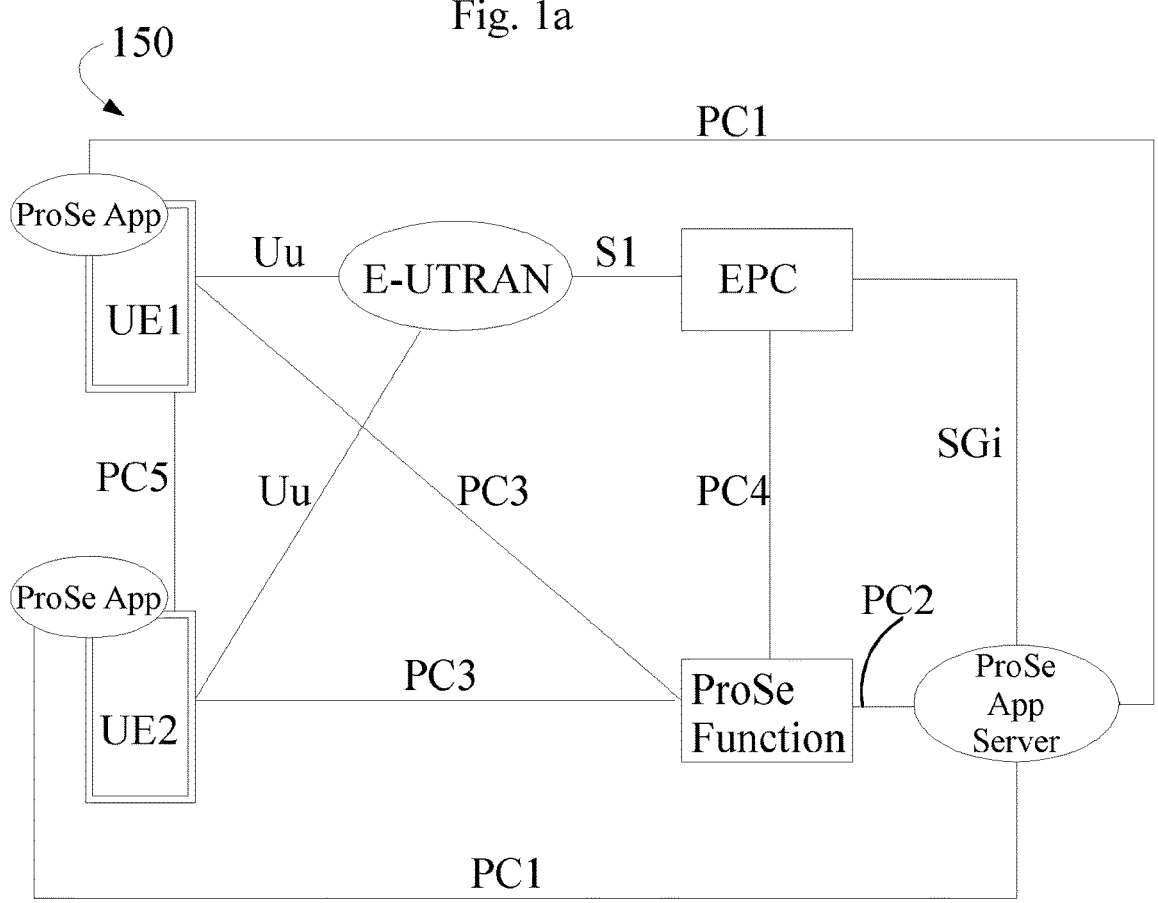
FIG. 1b shows, by way of example, a network architecture diagram of sidelink communication for proximity services.

FIG. 1b shows, by way of example, a network architecture diagram 150 of sidelink communication for proximity services for nonroaming case. User devices or equipments, e.g. UE1 and UE2, are connected to the same service provider's network, to the same public land mobile network (PLMN). However, sidelink communication may occur between UEs in different PLMNs, or between UEs in out of network coverage. Sidelink communication allows communication between two or more nearby user equipments, e.g. between UE1 and UE2, without involvement of the network node, e.g. a base station such as eNB. Evolved UMTS terrestrial radio access network (E-UTRAN) technology may be used e.g. for device-to-device (D2D) communication.

PC5 interface is the interface between the user equipments, e.g. UE1 and UE2. PC3 interface is the interface between the user equipment and a proximity service (ProSe) function. The ProSe Function has an important role in proximity services such as in processes of Direct Discovery and Direct Communication. With Direct Discovery, the two UEs that are in proximity of each other may be known by each other using direct signalling. With Direct Communication, two or more UEs may communicate with each other directly using reserved resources.

ProSe Function provides at least three sub-functions: Direct Provisioning Function (DPF), Direct Discovery Name Management Function and evolved packet core (EPC)-level Discovery Function. The DPF provisions the UE with all required parameters for Direct Discovery and Direct Communication for this particular network (PLMN). The task for the Direct Discovery Name Management Function is to allocate and process ProSe Application ID's and ProSe Application Codes that are used for Direct Discovery. This sub-function maintains a table that lists the mapping between the Application Identity (App ID) and Prose Application Code (ProSe App Code). In addition, the function may generate filter to enable a terminal to know whether an application code is interesting for a given ProSe application running on the device. An additional task for this sub-function is to contact the Home Subscriber Server (HSS) to check if the device is authorized to do Direct Discovery and if so, authorizes the device by synchronizing a ProSe Policy. Finally, it provides the device with integrity parameters to protect discovery messages that are transmitted over the air between the UEs.

ProSe Direct Discovery is enabled for scenario where there is network coverage, and is therefore under control by the serving network. In other words, the network may authorize a device on a "per UE" basis or a "per UE per application" basis to use Direct Discovery. There are two modes defined how discovery is being used. First, as an announcing terminal ("Here I am!" corresponds to Model A), where a device broadcasts information about itself. In this model a monitoring device is only looking for certain information of interest in its proximity. The announcing device sends out a discovery message that contains a ProSe Application Code. A discovery message is sent at predefined and network controlled occasions. A monitoring device would monitor these occasions, receive the discovery message and process it. The second model can be described with the phrase "Who is out there?" or "Are you out there?", i.e. corresponding to Model B. The 'Discoverer UE' sends out a request containing certain information about what it is interested in to discover. The 'Discoveree UE', that receives this message, can respond with some info related to the discoverer's request.

Figure 2:
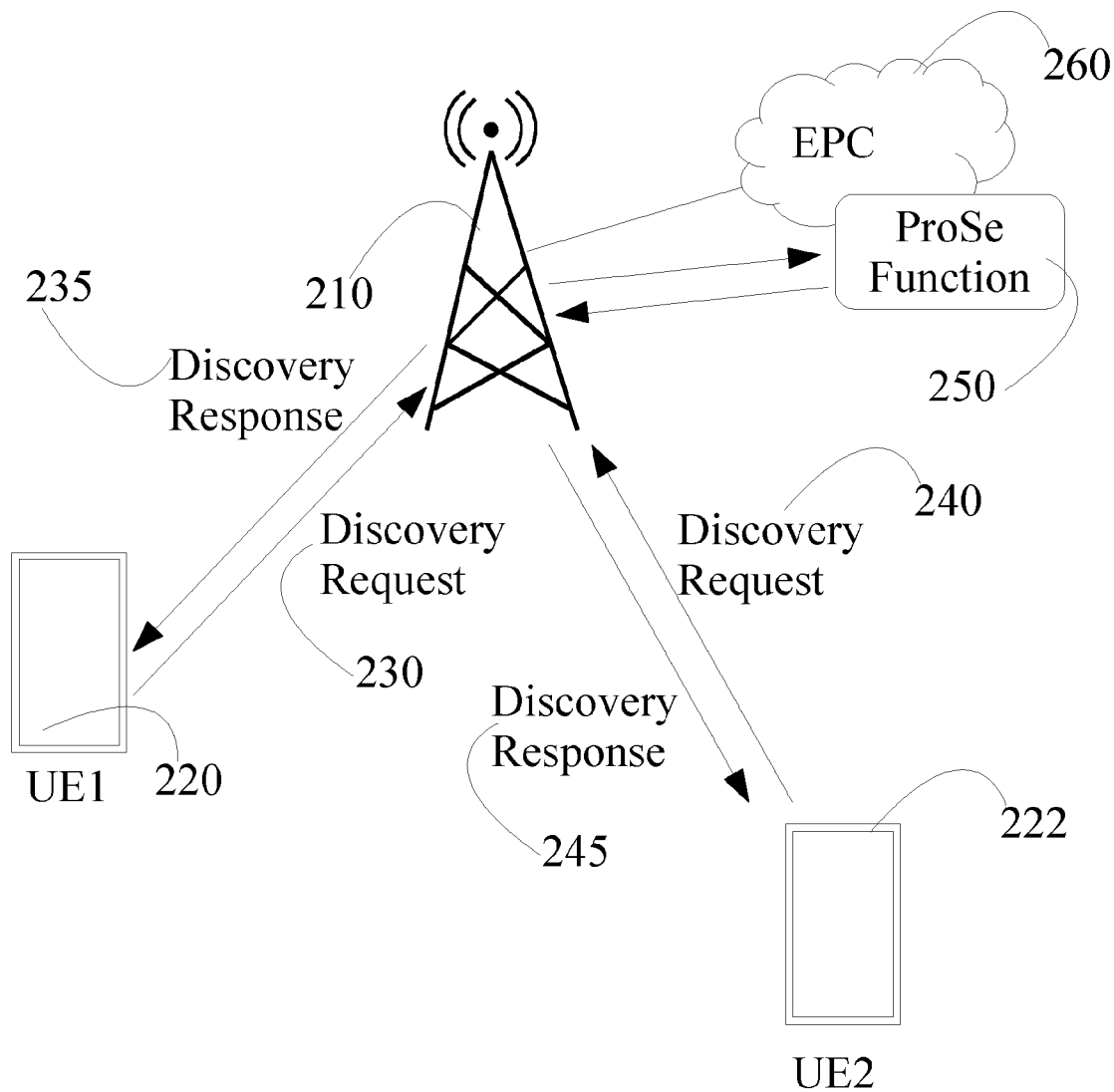
FIG. 2 shows, by way of example, discovery requests and discovery responses for announcing user equipment and monitoring user equipment.

Let us consider here the model A. FIG. 2 shows, by way of example, discovery requests and discovery responses for announcing user equipment 220 and monitoring user equipment 222. An 'Announcing UE', i.e. UE1 220 in FIG. 2, uses a discovery request procedure to obtain a ProSe Application Code. UE1 220 may then use the received ProSe Application Code for its announcements via a discovery message over the PC5 interface. PC5 interface is the interface between the user equipments, e.g. between UE1 220 and the UE2 222.

The discovery request message 230 transmitted from the UE1 220 to a network node 210 may comprise e.g. a Transaction ID, ProSe Application Identity (ID), the UE's identity in form of its international mobile subscriber identity (IMSI), the Ccommand which is set to 'Announce', and the Application ID. The ProSe Application ID and the Application ID are coming from higher layers.

The discovery request message 240 transmitted from the UE2 222 to the network node 210 comprises the same information as the discovery request message 230, with the, with the difference that the Command is set to 'Monitor'.

The Application ID is a unique identifier for the application that has triggered the transmission of the discovery request message. In both cases, announcing and monitor, the ProSe function 250 contacts the Home Subscriber Server (HSS) of EPC 260 to verify that the application, represented by the Application ID, is authorized for Direct Discovery. If positive, the ProSe function checks whether the device is authorized to use the ProSe Application Code either for announcement (UE1) or for monitoring (UE2).

Afterwards, the network 210 sends a discovery response message to the device. For the 'Announcing UE', i.e. UE1 220, the discovery response message 235 comprises e.g. the Transaction ID, the ProSe Application Code and a validity timer for this specific code. The validity timer may indicate for how long the code is valid. For the 'Monitoring UE', i.e. UE2 222, the discovery response message 245 comprises Transaction ID, one or more discovery filters and related filter IDs. After receiving the information comprised in the discovery response 235, the UE1 220 is configured and ready to announce. After receiving the information comprised in the discovery response 245, the UE2 is configured and ready to monitor desired information.

The discovery message is the information that an announcing UE transmits in the discovery resources. The monitoring UE may screen these resources to filter for information of interest. The discovery resources are either configured by the network or pre-configured in the device. If the device is in idle mode it may use, for example, the provided resource pool in system information block (SIB) Type 19 to announce the discovery message. A device that is already in connected state, e.g. in radio resource control (RRC) connected state, may be configured by the network node, e.g. eNB. The configuration may be performed via dedicated RRC signalling for autonomous resource selection after authorization has been verified by the network node, e.g. eNB. Alternatively, the network node, e.g. eNB, may provide a dedicated resource allocation to the terminal. A resource allocation is valid until the network node, e.g. eNB, reconfigures this allocation or the user equipment moves into idle state, e.g. in RRC idle state.

SIB Type 19 provides the information about the radio resource pool where a device is allowed to announce (transmit) or monitor (receive) discovery messages. The resource pool is defined by a discovery period. The discovery period may be e.g. up to 1024 radio frames or 10.24 seconds long. SIB Type 19 also defines a bitmap that indicates which subframes could be used for discovery and how often this bitmap is repeated within the discovery period. Additionally a resource configuration for the frequency domain is provided. The explicit number of resource blocks is broadcasted, including a start and end number. That allows the network to organize the uplink bandwidth in clusters. Alternatively, there might be no physical discovery channel or dedicated discovery resource pool or discovery period for sidelink communication. Thus, a discovery message may be multiplexed to the physical channel as any data packets. The proposed solution in this document is not restricted to whether a dedicated physical discovery channel is configured or not.

Figure 3:
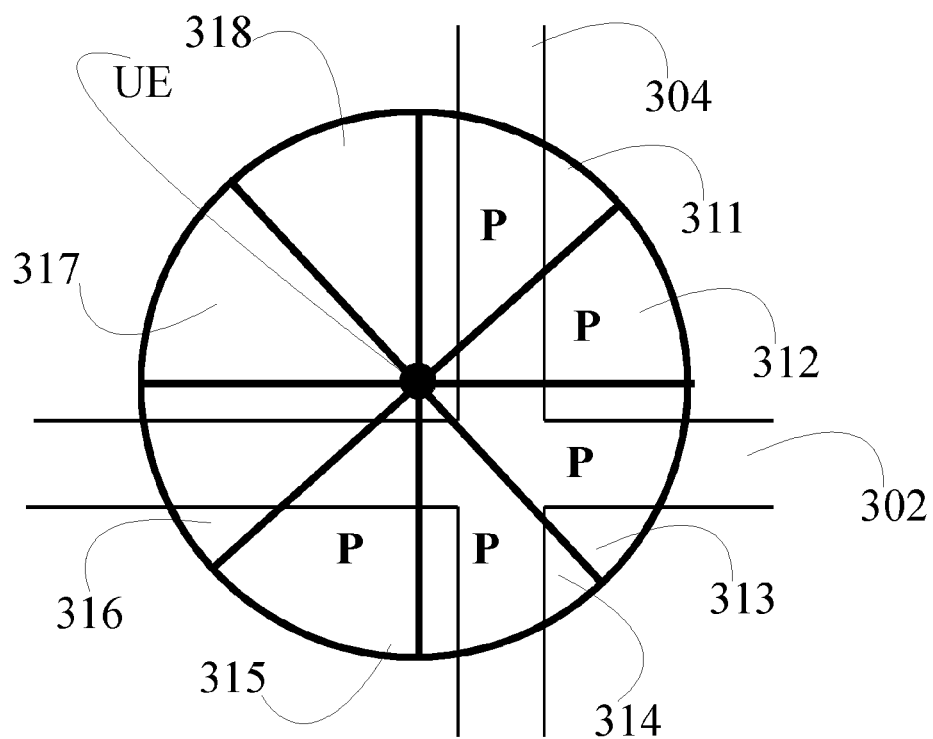
FIG. 3 shows, by way of example, a situation where there is a need to be aware of other UEs in proximity.

Let us consider the scenario depicted in FIG. 3 showing an example of a situation where there is a need to be aware of other UEs in proximity. UE 300 is carried by a pedestrian with visual impairments who is being aided by its UE. The pedestrian is at a road intersection (of roads 302 and 304), and is going to cross the road. Beam directions of the UE are shown by sectors 311, 312, 313, 314, 315, 316, 317, 318. In this setting, it is important that the UE becomes aware of other UEs, such as other pedestrians, cyclists or cars, which are coming from any of the directions marked as important beam directions, or priority directions, in FIG. 3, i.e. from sectors 311, 312, 313, 314, 315 marked by "P". For example, this may be achieved via the exchange of cooperative awareness messages (CAMs) or via a discovery procedure. CAMs are messages sent e.g. in vehicular communication systems in vehicle-to-everything (V2x) communication.

In a non-mmW setting, e.g. LTE, as directional antennas might not be used, common resources over which the Tx and Rx can exchange information with each other, may be found using sidelink operation. Sidelink discovery in non-mmW setting is defined for single antenna. For example, in LTE sidelink (ProSe) the eNB may broadcast the configuration, via the SIB type 19, of the time and frequency resources being dedicated to the discovery procedure, i.e. the discovery resource pools.

Considering sidelink operation in new radio (NR) releases in millimeter wave range, problem of directionality may occur. Directionality hear means that a UE can only listen (Rx) or transmit (Tx) in a given direction with a good radio condition at a certain time. This directionality is highly dependent on the number of antenna elements in place and is expected to become more restrictive the higher in frequency is the operating carrier. In other words, the Rx and Tx beam width will become tighter due to the required beamforming gain to compensate for the propagation losses at higher frequencies. Even though the beam width at the Rx could be widened, it would be at the cost of reduced Rx gain, since wide beams suffer from lower beamforming gain. This, in turn, may lead the UE to being unable to receive and decode weaker signals from other UEs in the vicinity.

There is a provided a method for enabling UEs to be informed of which beamforming directions to prioritize based on their current geographical area.

Figure 4:
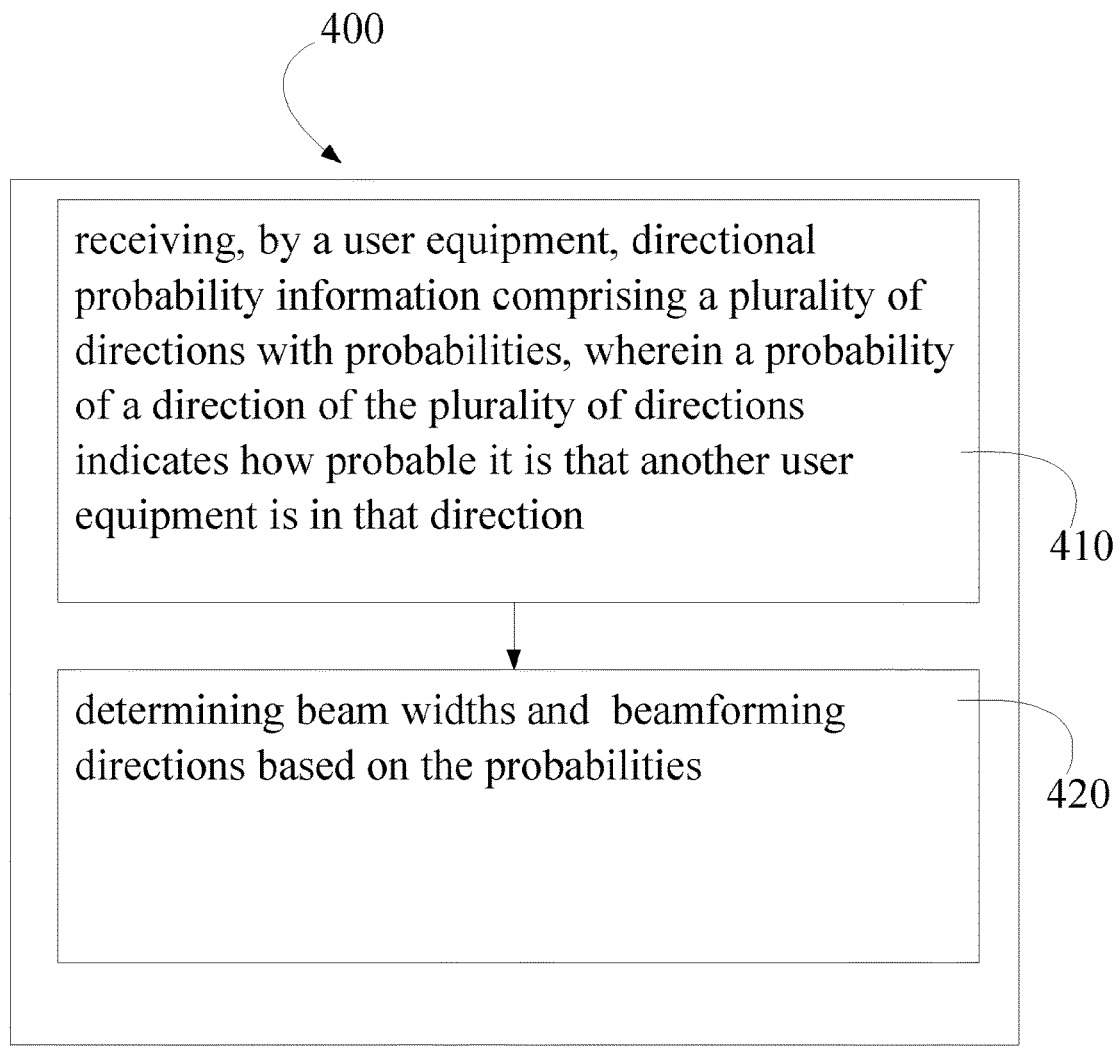
FIG. 4 shows, by way of example, a flowchart of a method.

FIG. 4 shows, by way of example, a flowchart of a method 400 for determining beam widths and beamforming directions. The phases of the method 400 may be performed e.g. by a user equipment, e.g. by device 100. The method 400 comprises receiving 410, by a user equipment, directional probability information comprising a plurality of directions with probabilities, wherein a probability of a direction of the plurality of directions indicates how probable it is that another user equipment is in that direction. The method 400 comprises determining 420 beam widths and beamforming directions based on the probabilities The method disclosed herein enables beam alignment between UEs, and enables UEs to discover each other via a data message (e.g. CAMs) or via a dedicated discovery procedure. The method disclosed herein solves interference issues that may be present when there are many devices with sidelinks around. The method disclosed herein improves the discovery of user equipments in close proximity to each other for performing sidelink communication. The method disclosed herein is beneficial, since no significant amount of information, e.g. the UEs three-dimensional (3D) position and orientation, need to be shared back and forward between the UEs and the network.

Let us consider, as an example, UEs which are actively listening or transmitting cooperative awareness messages (CAMs) or discovery beacons. The network node is aware of UE's position. Position of the UEs may be determined in various ways. For example, the UE may be equipped with global positioning system (GPS) and the UE may report precise location information to the network node. Reporting of the location information may be part of the control signalling. As another example, the network may listen to the CAM messages comprising the location of the UE. As a further example, positioning of the UE may be based on hybrid positioning system. For example, the GPS positioning may be assisted by network-based positioning applying e.g. triangulation, or advanced forward link trilateration.

A user equipment may receive directional probability information from a network node. The directional probability information comprises a plurality of directions with probabilities. A probability of a direction of the plurality of directions indicates how probable it is that another user equipment may be detected in that direction. The directional probability information is formed by the network node based on information, e.g. position information, received from user equipments located in the same geographical area. In addition or alternatively, the directional probability information may be based on the information received from an application server, which may provide the information that is valid for a certain time period. The directional probability information received by the UE may be UE/area specific, dedicated directional probability information, in a way that the directions are informed from the point of view of the UE that receives the information. For example, the directional probability information may be in the form of a directional probability vector (DPV). Alternatively, the directional probability information may be in the form of a table or any suitable data format that enables mapping between the directions and the probabilities.

Figure 5A:
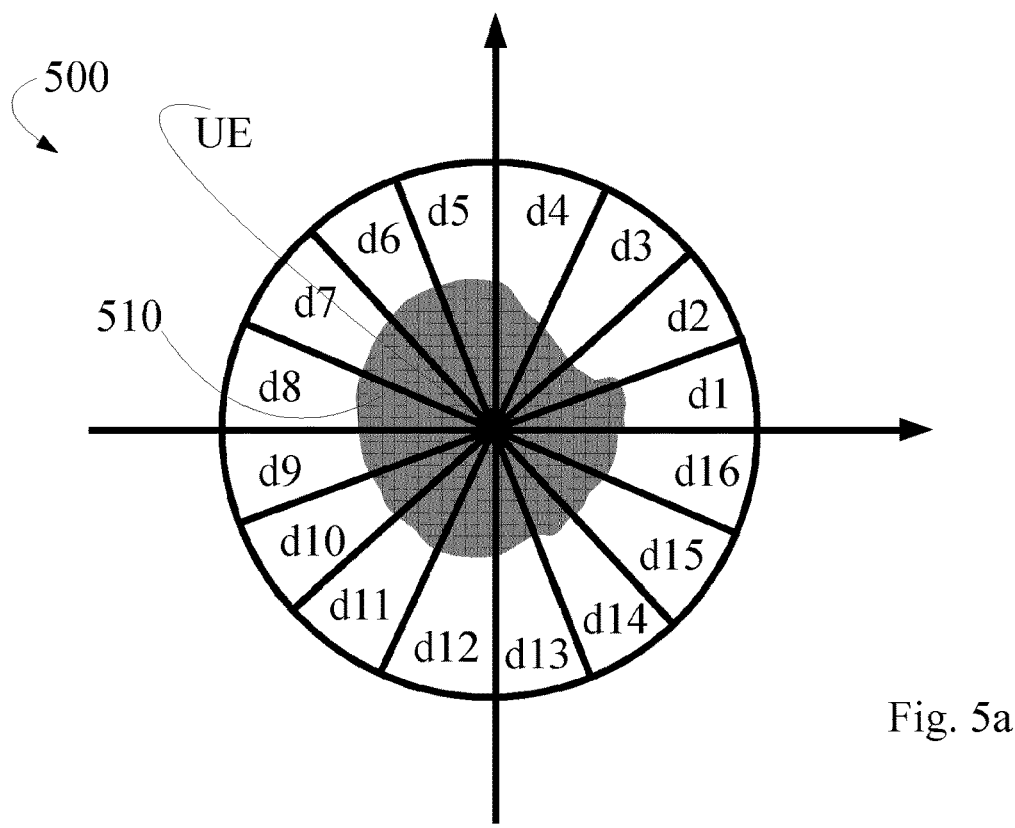
FIG. 5a shows, by way of example, a diagram of a directional probability vector.

FIG. 5a shows, by way of example, a diagram of a directional probability vector (DPV) 500. The UE is located in the center, or origin, of the diagram. The directions d1 to d16 are assigned a probability which is illustrated graphically by area 510. The further away from the center or origin the colored area 510 extends, the higher is the probability. The DPV states how likely it is that other UEs are in that direction. The DPV may also state the importance of the other UEs. The probability may be a combination of how likely it is that there are UEs in that direction and of a weight indicating their importance. In other words, the probability may further indicate importance of UEs, i.e. may be weighted with the importance. The weight may be e.g. a value between [0 and 1]. For example, an ambulance may be assigned a higher importance than a normal UE, e.g. a passenger car. Thus, an ambulance in one direction may lead to a higher DPV in that direction than 10 normal UEs in another direction. If no weight is assigned for a UE, the weight may be set to 1.

Figure 5B:
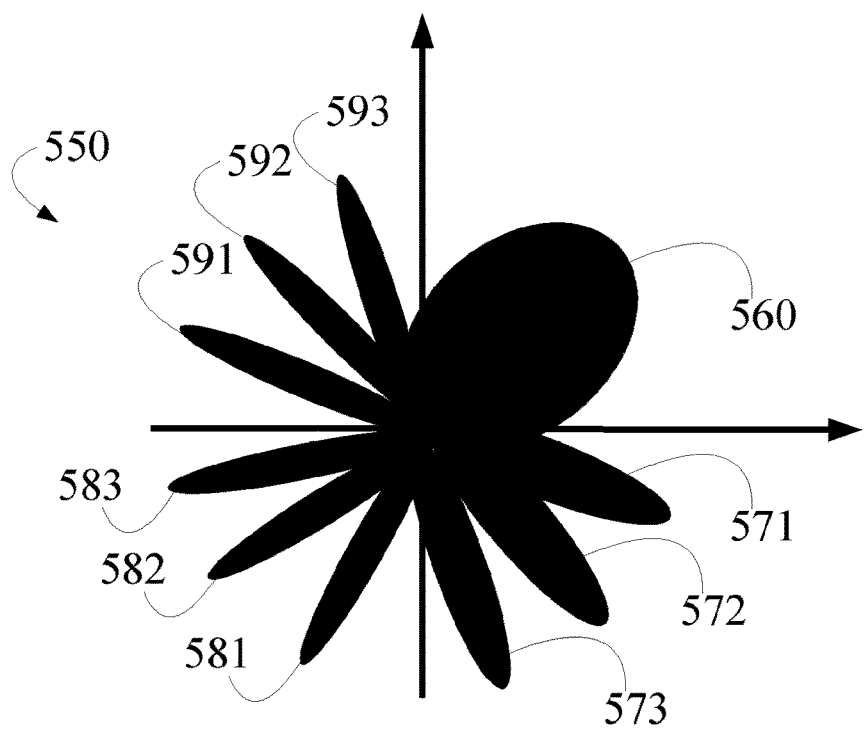
FIG. 5b shows, by way of example, a diagram of beamforming directions.

The UE then determines beamforming parameters based on the directional probability information. For example, the UE may determine how to use transmission resources, e.g. beam widths and beamforming directions based on the probabilities. Further, the UE may determine a period of time that the UE listens in a given direction. The UE may further use data from its own inertial sensors when determining the beamforming parameters, e.g. the beam widths and directions. Data from the inertial sensors may comprise e.g. roll, pitch and yaw. In case of transmission, output power and/or time-frequency-resources may also be adapted based on the directional probability information. FIG. 5b shows, by way of example, a diagram of beamforming directions 550 of a UE. The beamforming directions are determined based on the directional probability information. The number of beamforming beams does not need to be the same as the number of directions in the DPV. The number of the beams is dependent on UE implementation and may be based on e.g. capability, sensitivity, transmission time and/or frequency resource(s), and/or actual direction. In addition, UE-dynamics may also be considered to adjust the transmission parameters, e.g. UE velocity. For example, a single wider beam may be used for directions d1, d2, d3 and d4, while separate tight beams may be used in directions d5, d6, d7 and d8.

The UE may prioritize certain beamforming directions based on the directional probability information. For example, the UE may determine beam widths and beamforming directions based on the probabilities. Tx and Rx beams may be directed with appropriate beam width. For example, beam width of a beam directed to direction(s) with lower probability may be larger than beam width of a beam directed to directions(s) with higher probability. For example, beam 560 in FIG. 5b is wider than the beams 571, 573, 574; and the beams 571, 573, 574 are wider than the beams 581, 582, 583, 591, 592, 593. Beam widths may be determined based on thresholds determined for the probability values. The beamforming directions may be determined based on the probabilities and/or the determined beam widths. For example, the direction of a beam with a wider beam width may have a wider angular separation from a neighboring beam.

Wider beams may be used in lower priority areas, i.e. areas where DPV is lower, i.e. areas with less UEs and/or with UEs having lower importance. Use of narrower or tighter beams in areas where DPV is higher, i.e. areas with more UEs and/or with UEs having higher importance, will allow the receiver to more easily detect a UE and distinguish between multiple UEs.

From a Tx perspective, possible lower gains in the wider beam may be overcome with more transmission resources, such as higher transmission power, more time-and-frequency resources, and/or a more robust modulation and coding scheme.

Along with the directional probability information, the UE may receive validity information. The validity information indicates, for example, the conditions of when and where the directional probability information, e.g. DPV, is valid. For example, validity information may indicate a time interval, e.g. via a validity timer, for how long the DPV is valid. After a pre-determined time period the DPV is not valid anymore, and the UE may revert to a DPV with equal probability applied in all directions. Alternatively, the UE may receive a new, updated DPV. As another example, the validity information may indicate a geographical area where the directional probability information is valid. The UE may receive a plurality of direction probability information and a plurality of validity information, where each validity information corresponds to the conditions for using at least a corresponding direction probability information.

UE may receive a discovery message from a direction with a low probability. For example, the probability may be lower than a pre-determined threshold. The UE may be configured to transmit a message, e.g. an uplink report, to the network in response to receiving a discovery message from a direction which the DPV stated that there was a low probability of any discovery message occurring. The uplink report may comprise e.g. locations and/or directions of discovery signal receptions. The location here may comprise the location of the receiving UE and/or the location of the UE sending the discovery signal. The direction of discovery signal reception refers to the direction from which the discovery signal is received. Upon receiving this trigger based uplink report, the network node might trigger an unscheduled update of the DPVs in the position/area associated with the uplink report. Alternatively, or additionally, UE may transmit a message, e.g. emergency broadcast, to other UEs over PC5 interface in response to receiving a discovery message from a direction with a low probability, and the discovery message may contain the location information of the discovered UE. This approach enables the network and/or UEs to be aware of the existence of another UE, indirectly through a third UE. Alternatively, or additionally, UE may send a summary report, e.g. at pre-determined time intervals or in response to a request from the network, to the network. The UEs may individually send the summary report, or one UE may collect reports from the UEs around it and send a collective report to the network. The summary report may comprise e.g. locations and/or directions of discovery signal receptions, e.g. all discovery signal receptions. These mechanisms provide feedback information, which allows the network to update/correct the probabilities in future DPVs. In addition, this mechanism can also proactively alert the other nearby UEs to dynamically adjust their behaviours for monitoring the discovery message.

Figure 6:
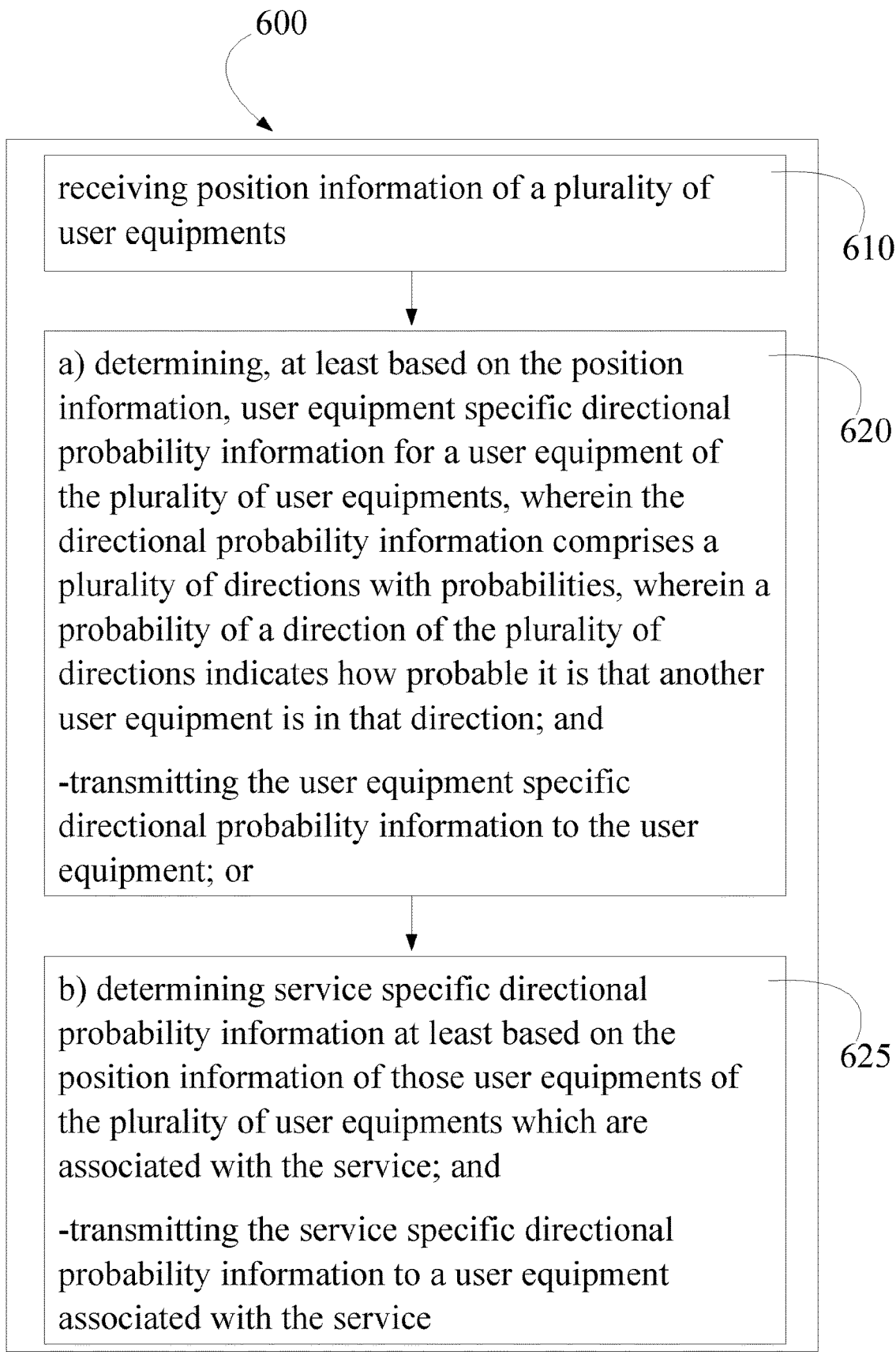
FIG. 6 shows, by way of example, a flowchart of a method.

FIG. 6 shows, by way of example, a flowchart of a method 600. The phases of the method 600 may be performed e.g. by a network node. The method 600 comprises receiving 610 position information of a plurality of user equipments. The method 600 comprises a) determining 620, at least based on the position information, user equipment specific directional probability information for a user equipment of the plurality of user equipments, wherein the directional probability information comprises a plurality of directions with probabilities, wherein a probability of a direction of the plurality of directions indicates how probable it is that another user equipment is in that direction; and transmitting the user equipment specific directional probability information to the user equipment; or b) determining 625 service specific directional probability information at least based on the position information of those user equipments of the plurality of user equipments which are associated with the service; and transmitting the service specific directional probability information to a user equipment associated with the service.

Figure 7A:
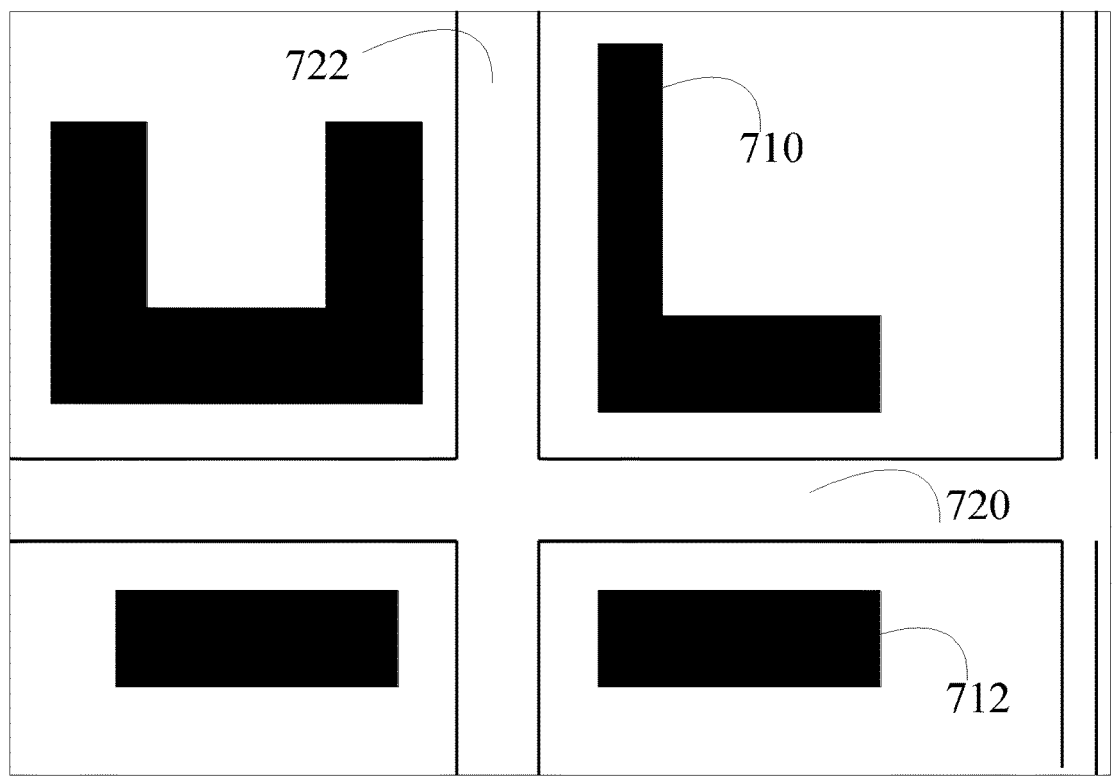
FIG. 7a shows, by way of example, a geographical area.

The directional probability information, e.g. DPV, provided by the network may be predicted based on the past and/or the current and/or future information reported by UEs at the same geographical area. The network node receives e.g. position information from a plurality of user equipments. In addition, the network node may receive other mobility-related information from the UEs, such as moving pattern, moving direction, etc. Further, information on the beam width, direction, etc. may be used for determination of the directional probability information. The plurality of user equipments are located at a specified geographical area. For example, the network may collect position information from UEs at geographical area shown, by way of example, in FIG. 7a. FIG. 7a shows an area with an intersection of streets 720 and 722, and some buildings 710, 712.

Figure 7B:
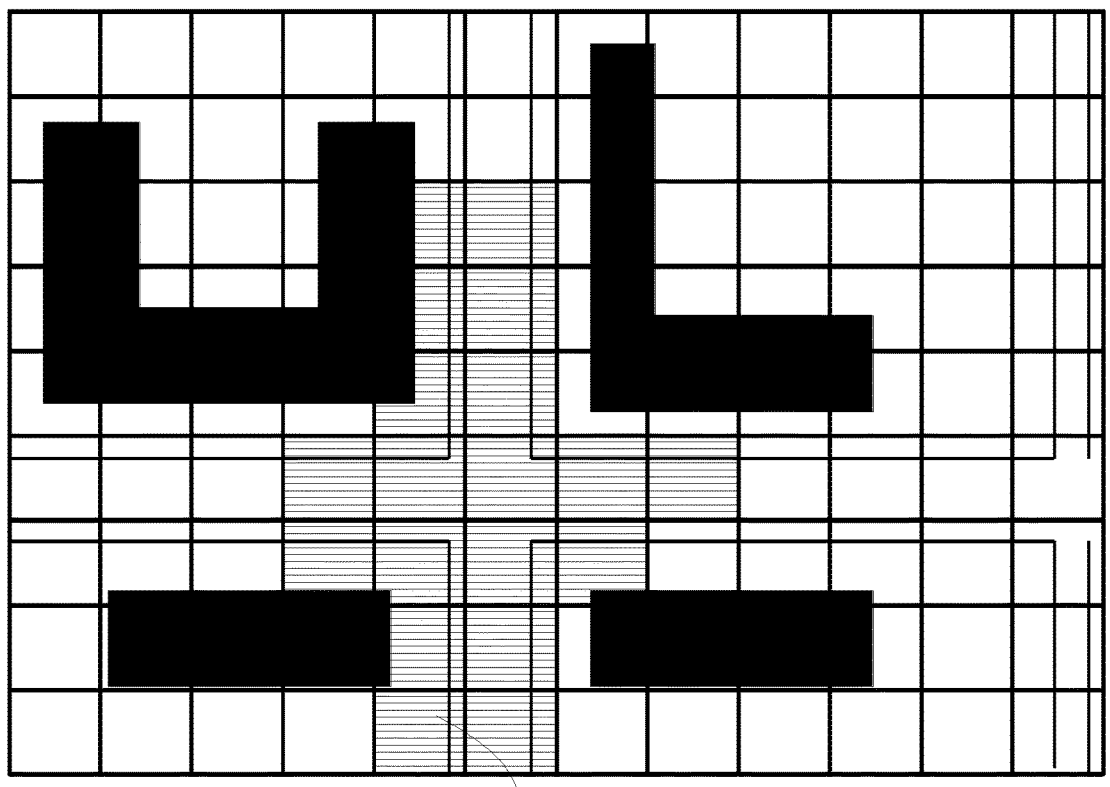
FIG. 7b shows, by way of example, a sectorized geographical area.

The network may elect to collect information and provide directional probability information, e.g. DPV, only from critical locations. Thus, the plurality of user equipments, from which the network node receives position information, may be located at pre-defined area or locations assigned as critical. An example of partitioning and identification of critical regions is given in FIG. 7b which shows, by way of example, a sectorized geographical area. Critical sectors or regions 750 are marked with hatching. In this example, the network would provide beam alignment aid in the regions marked with hatching. Critical sectors may be defined by the network. For example, a region with many UEs and/or with many high priority or important UEs may be defined as critical sector. As another example, a traffic application may define critical sectors, e.g. based on previously happened accidents in a specific region, which may then be assigned as a critical sector.

The directional probability information may be determined, e.g. DPV may be constructed, based on the experience observed by each UE over time in a geographical area. UE specific directional probability information, e.g. DPV, may be determined at least based on the position information of the UEs. Further, information on the beams used by the UE when receiving, such as beam width, beam direction, etc., may be used for determination of the DPV. In addition, the number of the UEs whose information is used for construction of the DPV may be used for determination of the DPV. The network may determine the direction of the beams by comparing the location of paired UEs.

Figure 7C:
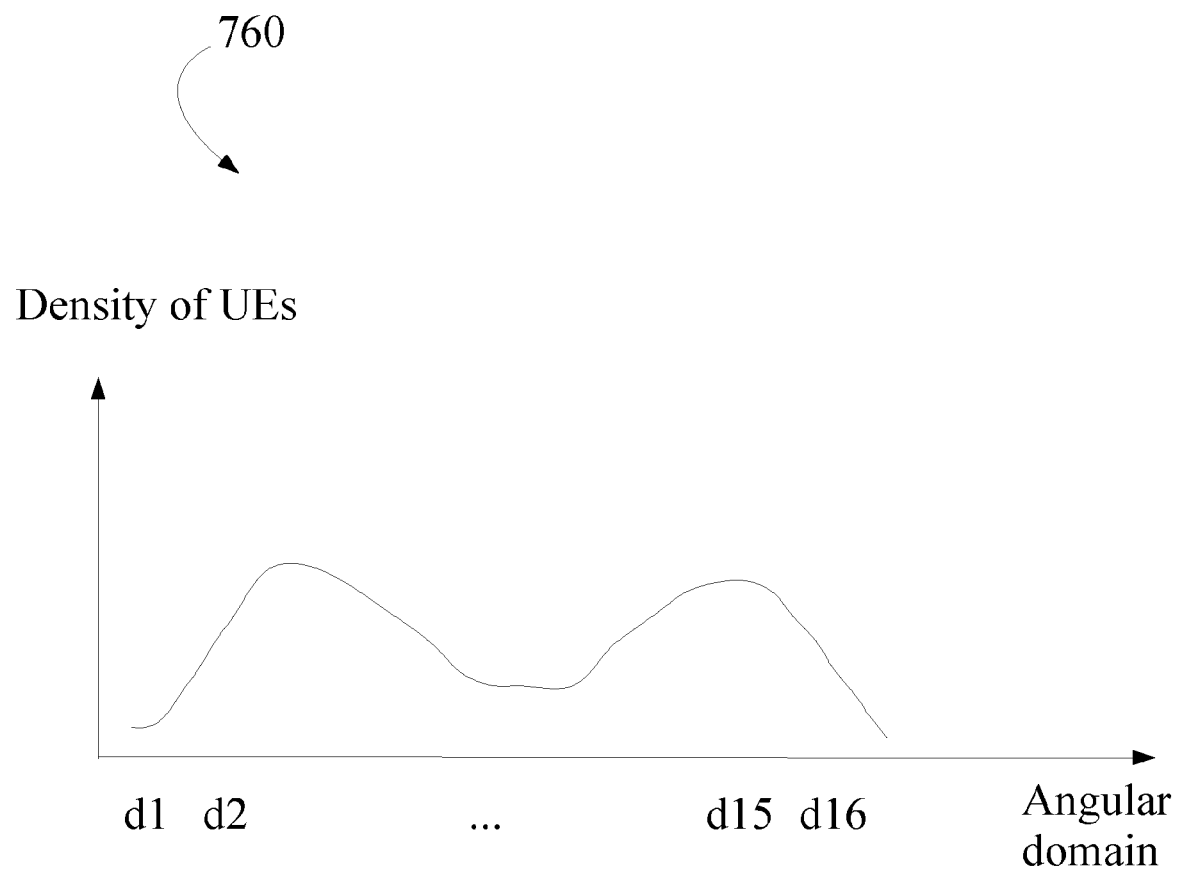
FIG. 7c shows, by way of example, a graph illustrating density of user equipments in angular domain.

For the construction of the DPV, the network node collects the trigger based uplink reports and summary reports, and computes for a given position in the angular domain the density of nearby UEs. FIG. 7c shows, by way of example, a graph 760 illustrating density of UEs in the angular domain. The network node then shares this information with the UEs that are at the given position. This procedure may be done for all the positions or areas identified to be used. The UE may decide based on its beamforming capabilities into how many directions it should partition the DPV. For example, the DPV shared by the network node may be divided into 60 directions, i.e. it has a resolution of 6 degrees. The UE may decide to group the directions into smaller groups, e.g. into 16 directions, when the resolution would be 22.5 degrees.

As previously described, the geographical area may be specified, and the network may elect to collect information related to the DPV only from critical locations. This information may be collected at the network either by configuring the UEs to provide periodic and/or event-triggered reports or by the network pooling a sample of UEs in the area of interest. Alternatively, it can be configured by manual planning or automatic planning based on, e.g. traffic planning tools.

The directional probability information, e.g. the DPV, may be provided e.g. on a per-UE or on a per-service basis. Per-UE basis means that the network infrastructure may consider all the UEs in the cell, irrespective of the individual services and the UE-type. The UE may be any type of UE, e.g. a moving UE such as a vehicle, or a fixed UE such as a roadside unit. Directional probability information may be tailored in a way that the directions are informed from the point of view of the UE that receives the directional probability information.

Per-service basis means that different services might be provided with different directional probability information, e.g. different DPVs. For example, different services might be associated with different UEs, so a service associated with a group of UEs does not need directional probability information on the UEs that are not associated with that service. For example, some vehicle-to-infrastructure (V2I) services require the peer communication entity to be a fixed network infrastructure, e.g., a roadside unit. Thus, it differs from the vehicle-to-vehicle (V2V) services wherein the peer entities may be another moving vehicle. Service specific directional probability information may be determined based on the position information of those user equipments of the plurality of user equipments which are associated with the service. There may be many services, and there may be different UEs associated with different services. The service-specific directional probability information, e.g. service-specific DPVs, may be either broadcasted e.g., for services with ultra-high reliable and low latency requirement, or dedicatedly transmitted.

The network node may receive a message, e.g. a report, from one or more user equipments. The message may comprise locations and/or directions of discovery signal receptions as experienced by the one or more user equipments. The network node may then update the directional probability information based on the received message, e.g. the report.

Let us consider two or more networks, e.g. at least a first network and a second network. A UE is served by the first network but is not associated with the second network. Mobility-related information, e.g. location or position and/or moving pattern, of the UEs served by the first network, e.g. PLMN, may be similar or statistically correlated with that of the UEs served by the second network in the same area. Thus, the directional probability information, e.g. DPV, derived from the first network may be used to discover the UEs served by the second network as well. This procedure has less signalling overhead than a procedure which requires collecting real-time location information of different UEs from different networks.

Figure 8A:
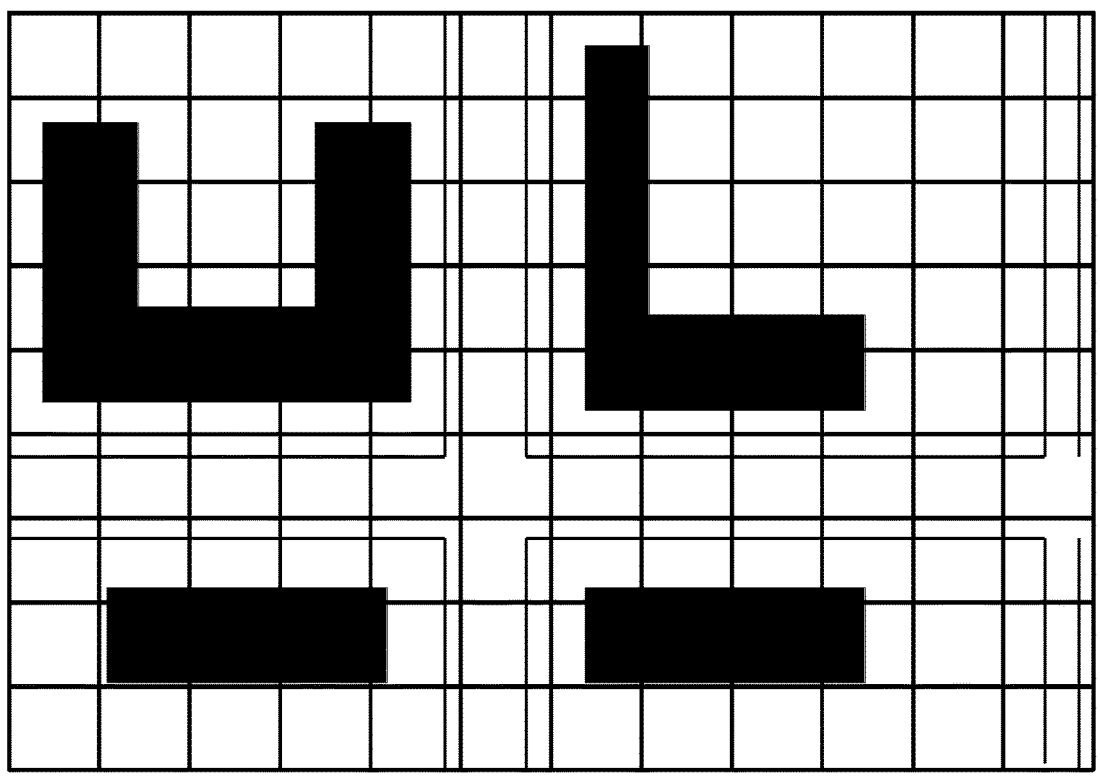
FIGS. 8a and 8b show, by way of examples, geographical areas where directional probability information is applicable.
Figure 8B:
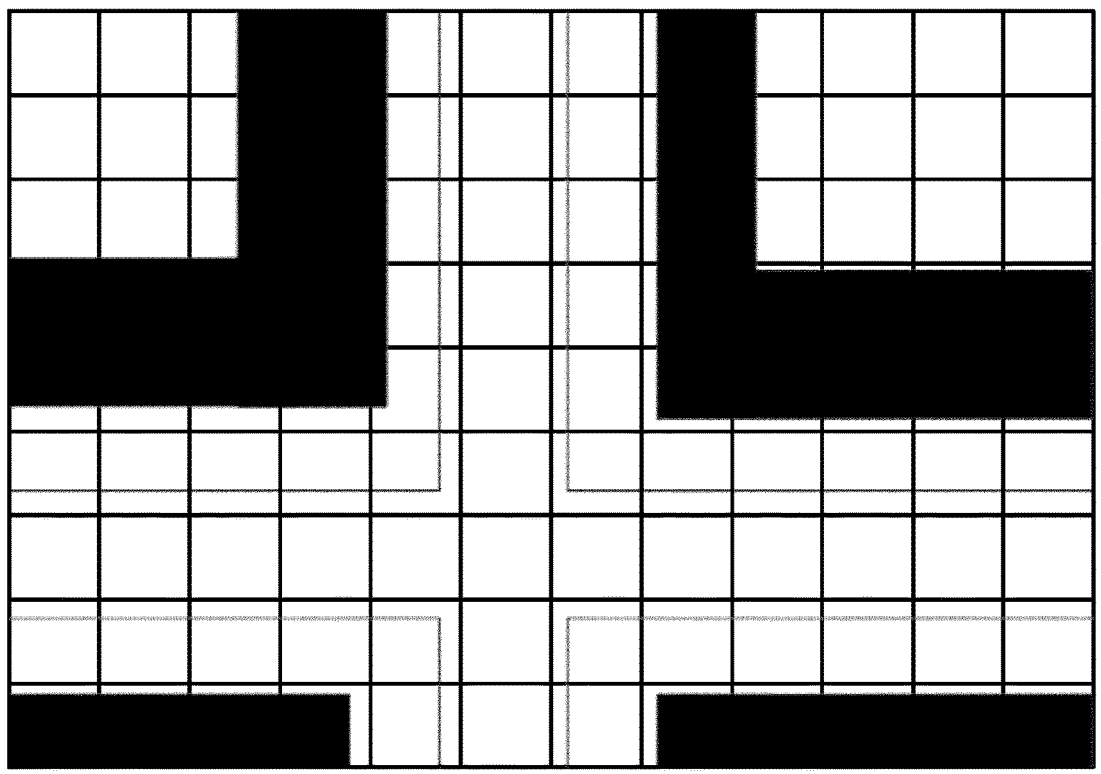

FIG. 8a and FIG. 8b show, by way of examples, geographical areas where directional probability information is applicable. The resolution of the directional probability information describes how big is the area where the directional probability information, e.g. the DPV, is applicable. FIG. 8a shows, by way of example, area corresponding to coarse resolution. FIG. 8b shows, by way of example, area corresponding to fine resolution. The fine resolution corresponds to a smaller area than the coarse resolution. The maximum resolution of the directional probability information is dependent on the resolution associated with the UE positioning, and on whether the network has enough collected information to achieve the requested resolution. Geographical areas with denser deployment of UEs may be able to enable finer resolutions than geographical areas with sparser deployment of UEs, since the more there are UEs in a specified geographical area the more information may be received by the network for the formation of the directional probability information.

The resolution of the DPV may alternatively be related to number of directions comprised in the directional probability information. For example, a DPV with a coarse resolution may be considered to provide e.g. 2 directions: one for 0-180 degrees and another for 180-360 degrees. A DPV with finer resolution may be considered to provide e.g. 4 directions: one for 0-90 degrees, one for 90-180 degrees, one for 180-270 degrees and one for 270-360 degrees. This approach would allow broadcasting the coarse information with limited signalling overhead, and transmit the fine resolution information only when it is needed.

Figure 9:
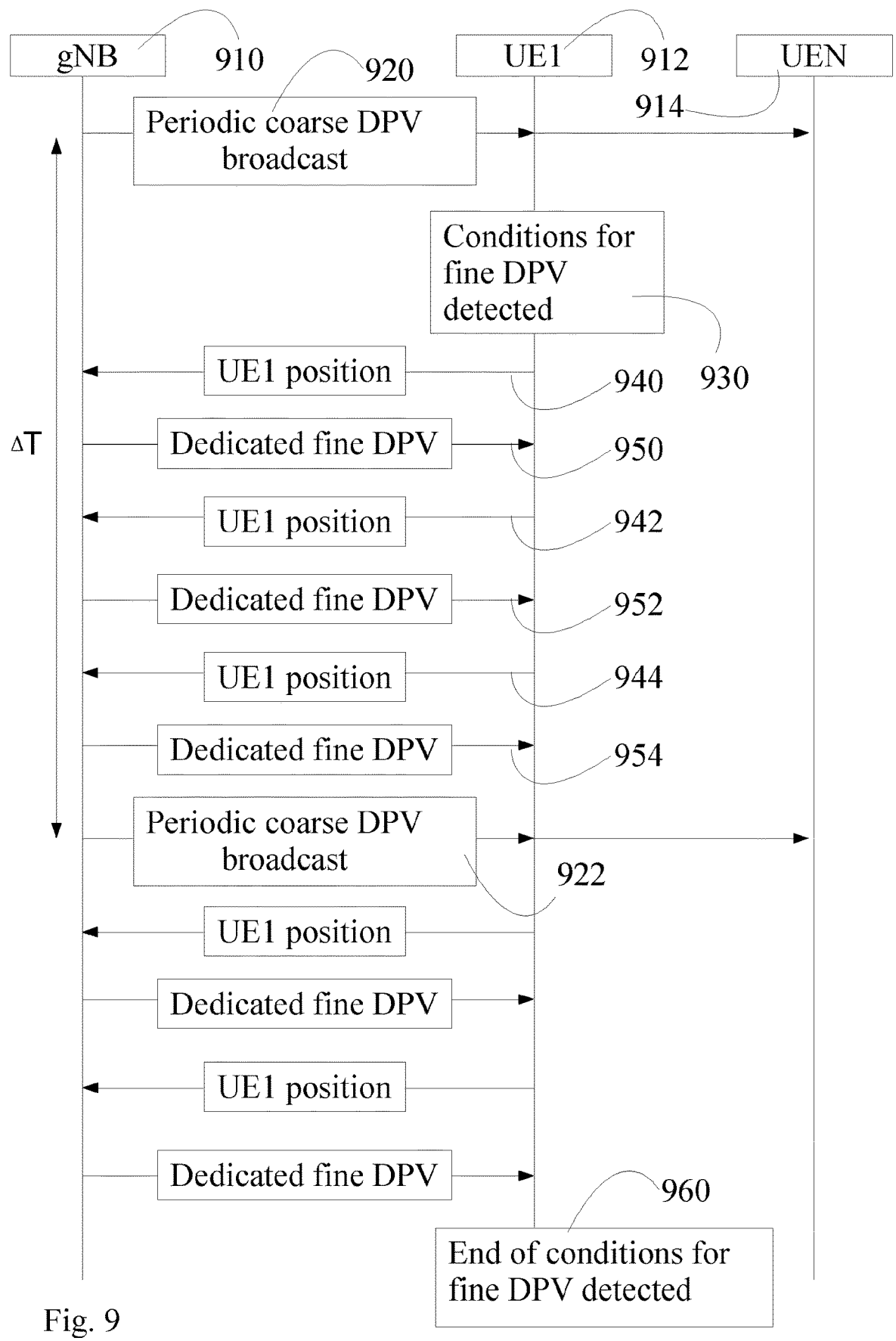
FIG. 9 shows, by way of example, signalling between a network node and UEs.

FIG. 9 shows, by way of example, signalling between a network node and UEs. More precisely, FIG. 9 shows transmission of coarse and fine DPV. In this example, broadcast of coarse DPV is interlaced with transmission of dedicated fine DPV. Transmission of the directional probability information, e.g. DPV, towards the UE may be dependent on the resolution of the directional probability information. Let us consider coarse resolution first, e.g. coarse DPV. The network node 910, e.g. gNB, may periodically broadcast 920, 922 the coarse DPV to the UEs, e.g. UE1 912, . . . , UEN 914, e.g. all UEs under its coverage. Time period between the broadcasts is defined by ΔT. The broadcasting may be carried out via a dedicated SIB or via a pointer in the SIB dedicated to sidelink configurations. The pointer points to the time and frequency resources where this information is to be shared, e.g. by assigning a dedicated radio network temporary identifier (RNTI) and a periodicity on how often this information is to be shared.

At a certain point in time, the UE may detect 930 condition(s) that require directional probability information with fine resolution, e.g. fine DPV. For example, the UE may move with high velocity which is above a pre-determined threshold, and this velocity may trigger detection of condition that requires fine DPV. In response to detecting condition that requires fine DPV, the UE starts to transmit 940, 942, 944 its position with higher frequency to the network node, e.g. gNB. The network node may receive a separate message concerning the need for fine DPV, or it is configured to construct finer DPV in response to receiving position information with higher frequency from a UE with need for fine DPV. The UE then starts to receive 950, 952, 954 fine DPV more frequently, until the conditions for fine DPV are no longer met 960. The UE may still continue receiving the periodic broadcast of coarse DPV.

The network node may provide in its SIBs that it supports DPV, i.e. determination of directional probability information. This may be indicated e.g. using a single flag. When the UE requires the directional probability information, or meets the conditions to require this information, and if the flag is active, then the UE can request it on demand. The condition to require the directional probability information may be e.g. UE entering a pre-determined geographical area and/or UE going above a pre-determined velocity. Thus, the UE may request for DPV e.g. when entering a complicated environment area with a high velocity.

Validity of the directional probability information may be associated to a geographical area and/or to a time interval. When the network node shares the directional probability information, e.g. DPV, it may, for example, explicitly enforce the validity of the DPV by stating for how long the DPV is valid. The validity information may be indicated to the UE along with the directional probability, e.g. in a report transmitted to the UE, or via configuration shared via the SIB. In terms of geographical area validity, the network node may ensure that the DPV is shared in a specific area, e.g. only in a specific area. For example, the network node may beamform the broadcasted report in order to ensure that the DPV is shared in a specific area.

The network may define when the directional probability information is applicable. For example, the network node may trigger conditions of when the directional probability information, e.g. DPV, becomes relevant for a user equipment. For example, DPV may be required for UEs going above a pre-determined velocity, and/or for UEs entering a pre-determined geographical area. For example, the network node may receive a request for DPV from a UE entering a complicated environment with a high velocity. The network node may instruct a UE to perform a beam sweep with a certain periodicity in order to detect UEs from new directions.

Figure 10:
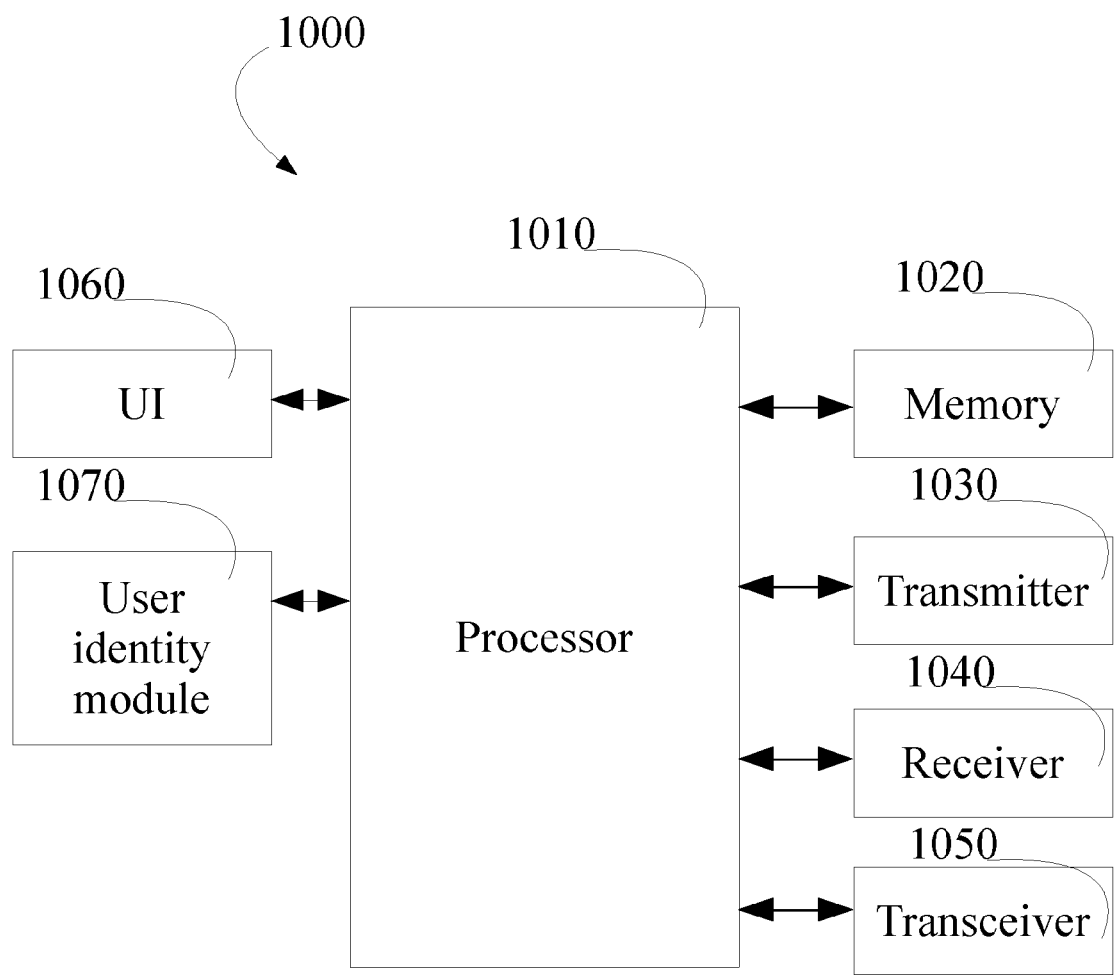
FIG. 10 shows, by way of example, a block diagram of an apparatus.

FIG. 10 shows, by way of example, an apparatus capable of e.g. performing the method disclosed herein. Illustrated is device 1000, which may comprise, for example, a mobile communication device such as mobile 100 of FIG. 1a., or the network node 104. Comprised in device 1000 is processor 1010, which may comprise, for example, a single- or multi-core processor wherein a single-core processor comprises one processing core and a multi-core processor comprises more than one processing core. Processor 1010 may comprise, in general, a control device. Processor 1010 may comprise more than one processor. Processor 1010 may be a control device. A processing core may comprise, for example, a Cortex-A8 processing core manufactured by ARM Holdings or a Steamroller processing core designed by Advanced Micro Devices Corporation. Processor 1010 may comprise at least one Qualcomm Snapdragon and/or Intel Atom processor. Processor 1010 may comprise at least one application-specific integrated circuit, ASIC. Processor 1010 may comprise at least one field-programmable gate array, FPGA. Processor 1010 may be means for performing method steps in device 1000. Processor 1010 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 1000 may comprise memory 1020. Memory 1020 may comprise random-access memory and/or permanent memory. Memory 1020 may comprise at least one RAM chip. Memory 1020 may comprise solid-state, magnetic, optical and/or holographic memory, for example. Memory 1020 may be at least in part accessible to processor 1010. Memory 1020 may be at least in part comprised in processor 1010. Memory 1020 may be means for storing information. Memory 1020 may comprise computer instructions that processor 1010 is configured to execute. When computer instructions configured to cause processor 1010 to perform certain actions are stored in memory 1020, and device 1000 overall is configured to run under the direction of processor 1010 using computer instructions from memory 1020, processor 1010 and/or its at least one processing core may be considered to be configured to perform said certain actions. Memory 1020 may be at least in part comprised in processor 1010. Memory 1020 may be at least in part external to device 1000 but accessible to device 1000.

Device 1000 may comprise a transmitter 1030. Device 1000 may comprise a receiver 1040. Transmitter 1030 and receiver 1040 may be configured to transmit and receive, respectively, information in accordance with at least one cellular or non-cellular standard. Transmitter 1030 may comprise more than one transmitter. Receiver 1040 may comprise more than one receiver. Transmitter 1030 and/or receiver 1040 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 1000 may comprise a near-field communication, NFC, transceiver 1050. NFC transceiver 1050 may support at least one NFC technology, such as NFC, Bluetooth, Wibree or similar technologies.

Device 1000 may comprise user interface, UI, 1060. UI 1060 may comprise at least one of a display, a keyboard, a touchscreen, a vibrator arranged to signal to a user by causing device 1000 to vibrate, a speaker and a microphone. A user may be able to operate device 1000 via UI 1060, for example to accept incoming telephone calls, to originate telephone calls or video calls, to browse the Internet, to manage digital files stored in memory 1020 or on a cloud accessible via transmitter 1030 and receiver 1040, or via NFC transceiver 1050, and/or to play games.

Device 1000 may comprise or be arranged to accept a user identity module 1070. User identity module 1070 may comprise, for example, a subscriber identity module, SIM, card installable in device 1000. A user identity module 1070 may comprise information identifying a subscription of a user of device 1000. A user identity module 1070 may comprise cryptographic information usable to verify the identity of a user of device 1000 and/or to facilitate encryption of communicated information and billing of the user of device 1000 for communication effected via device 1000.

Processor 1010 may be furnished with a transmitter arranged to output information from processor 1010, via electrical leads internal to device 1000, to other devices comprised in device 1000. Such a transmitter may comprise a serial bus transmitter arranged to, for example, output information via at least one electrical lead to memory 1020 for storage therein. Alternatively to a serial bus, the transmitter may comprise a parallel bus transmitter. Likewise processor 1010 may comprise a receiver arranged to receive information in processor 1010, via electrical leads internal to device 1000, from other devices comprised in device 1000. Such a receiver may comprise a serial bus receiver arranged to, for example, receive information via at least one electrical lead from receiver 1040 for processing in processor 1010. Alternatively to a serial bus, the receiver may comprise a parallel bus receiver.

Device 1000 may comprise further devices not illustrated in FIG. 10. For example, where device 1000 comprises a smartphone, it may comprise at least one digital camera. Some devices 1000 may comprise a back-facing camera and a front-facing camera, wherein the back-facing camera may be intended for digital photography and the front-facing camera for video telephony. Device 1000 may comprise a fingerprint sensor arranged to authenticate, at least in part, a user of device 1000. In some example embodiments, device 1000 lacks at least one device described above. For example, some devices 1000 may lack a NFC transceiver 1050 and/or user identity module 1070.

Processor 1010, memory 1020, transmitter 1030, receiver 1040, NFC transceiver 1050, UI 1060 and/or user identity module 1070 may be interconnected by electrical leads internal to device 1000 in a multitude of different ways. For example, each of the aforementioned devices may be separately connected to a master bus internal to device 1000, to allow for the devices to exchange information. However, as the skilled person will appreciate, this is only one example and depending on the embodiment various ways of interconnecting at least two of the aforementioned devices may be selected.

What is claimed is:

1. An apparatus, comprising:
   one or more processors; and
   one or more memories storing instructions that, when executed by the one or more processors, cause the apparatus to perform:
   receive directional probability information comprising a plurality of directions with associated probabilities, wherein each of the associated probabilities indicates a probability of another user equipment being in a direction relative to a user equipment;
   determine a plurality of beam widths and a plurality of beamforming directions based on the associated probabilities;
   receive at least one discovery message from a direction, of the plurality of directions, with a low probability; and
   transmit an uplink report to a network node and to the other user equipment in response to receiving the at least one discovery message from the direction with the low probability, wherein the uplink report comprises locations and directions of discovery signal receptions, and wherein the location comprises a location of the apparatus and a location of the user equipment from which the at least one discovery message is received.

2. The apparatus of claim 1, wherein the directional probability information further indicates importance of the other user equipment relative to the user equipment.

3. The apparatus of claim 1, wherein the determination of the plurality of beam widths and the plurality of beamforming directions comprises at least:
   determining a first beam width for a first beam in a first direction with a first probability; and
   determining a second beam width for a second beam in a second direction with a second probability, wherein the second probability is higher than the first probability, and wherein the first beam width is wider than the second beam width.

4. The apparatus of claim 1, wherein the instructions, when executed by the one or more processors, further cause the apparatus to perform the following:
   transmit at a determined time interval, a report comprising the location(s) and/or the direction(s) of the received at least discovery signal.

5. The apparatus of claim 4, wherein the instructions, when executed by the one or more processors, further cause the apparatus to perform the following:
   receive an updated directional probability information.

6. The apparatus of claim 1, wherein the instructions, when executed by the one or more processors, further cause the apparatus to perform the following:
   transmit position information of the apparatus to the network node.

7. The apparatus of claim 1, wherein the instructions, when executed by the one or more processors, further cause the apparatus to perform the following:
   receive validity information on how long the directional probability information is valid and/or where the directional probability information is valid;
   determine that the directional probability information is not valid at least based on the validity information;
   set substantially equal probability for the plurality of directions; and
   determine the beam widths and a period of time to listen at different directions to be equally divided across the different directions.

8. An apparatus, comprising:
   one or more processors; and
   one or more memories storing instructions that, when executed by the one or more processors, cause the apparatus to perform:
   receive position information of a plurality of user equipments;
   a) determine, based on the position information, user equipment specific directional probability information for a user equipment of the plurality of user equipments, wherein the specific directional probability information comprises a plurality of directions with associated probabilities, wherein each of the associated probabilities indicates a probability of another user equipment being in a direction relative to the user equipment; and
   transmit the user equipment specific directional probability information to the user equipment; or
   b) determine service specific directional probability information based on the position information of those user equipments of the plurality of user equipments associated with the service;

transmit the service specific directional probability information to a user equipment associated with the service,
receive a request for directional probability information with finer resolution;
receive position information with higher frequency from the user equipment;
determine the directional probability information with finer resolution for the user equipment from which the request and the position information with higher frequency is received; and
transmit the directional probability information with finer resolution to the user equipment.

9. The apparatus of claim 8,
wherein the specific directional probability information further indicates importance of another user equipment relative to the user equipment.

10. The apparatus of claim 8, wherein the position information is received from the plurality of user equipments located at a specified geographical area.

11. The apparatus of claim 8, wherein the instructions, when executed by the one or more processors, further cause the apparatus to perform the following:
receive one or more reports from one or more user equipments of the plurality of user equipments, wherein each report of the one or more reports comprises locations and/or directions of discovery signal receptions by the one or more user equipments;
updating the directional probability information based on the received one or more reports; and
transmitting the updated directional probability information to the user equipment.

12. A method, comprising:
receiving, by a user equipment, directional probability information comprising a plurality of directions with associated probabilities, wherein each of the associated probabilities indicates a probability of another user equipment being in a direction relative to the user equipment;
determining a plurality of beam widths and a plurality of beamforming directions based on the associated probabilities;
receiving at least one discovery message from a direction, of the plurality of directions, with a low probability; and
transmitting an uplink report to a network node and to the other user equipment in response to receiving the at least one discovery message from the direction with the low probability, wherein the uplink report comprises locations and directions of discovery signal receptions, and wherein the location comprises a location of the apparatus and a location of the user equipment from which the at least one discovery message is received.

13. The method of claim 12, wherein the directional probability information further indicates importance of the other user equipment relative to the user equipment.

14. The method of claim 12, wherein determining the plurality of beam widths and the plurality of beamforming directions comprises at least:
determining a first beam width for a first beam in a first direction with a first probability; and
determining a second beam width for a second beam in a second direction with with a second probability, wherein the second probability is higher than the first probability, and wherein the first beam width is wider than the second beam width.

15. The method of claim 12, further comprising:
transmitting at determined time intervals, a report comprising the location(s) and/or the direction(s) of the received at least one discovery signal.

16. The method of claim 12, further comprising:
receiving un updated directional probability information.

17. The method of claim 12, further comprising:
transmitting position information of the apparatus to the network node.

\* \* \* \* \*